(12) United States Patent
Zecchini

(10) Patent No.: US 6,192,872 B1
(45) Date of Patent: Feb. 27, 2001

(54) METHOD AND ARTICLE OF MANUFACTURE FOR IMPROVING FUEL/AIR MIXING IN INTERNAL COMBUSTION ENGINES

(76) Inventor: Gabriel Zecchini, Calle Los Pinos, Sector Montaña, Municipio Independencia, Yaracuy (VE)

( * ) Notice: Subject to any disclaimer, the term of this patent is extended or adjusted under 35 U.S.C. 154(b) by 0 days.

(21) Appl. No.: 09/305,866

(22) Filed: May 5, 1999

(51) Int. Cl.$^7$ .................................................. F02M 29/00
(52) U.S. Cl. ........................................ 123/590; 260/78.1
(58) Field of Search ................................. 123/590, 593; 261/78.1; 48/180.1

(56) References Cited

U.S. PATENT DOCUMENTS

| | | |
|---|---|---|
| 1,939,302 | 12/1933 | Heaney . |
| 2,163,649 | 6/1939 | Weaver . |
| 2,414,494 | 1/1947 | Vang . |
| 2,453,595 | 11/1948 | Rosenthal . |
| 2,454,900 | 11/1948 | Vang . |
| 2,791,990 | 5/1957 | Grieb . |
| 3,016,233 | 1/1962 | Olmstead . |
| 3,414,242 | * 12/1968 | Bouteleux ............................. 261/18 |
| 3,533,606 | 10/1970 | Thatcher . |
| 3,756,575 | 9/1973 | Cottell ...................................... 261/1 |
| 3,826,235 | * 7/1974 | Pasbrig ................................. 123/590 |
| 3,955,545 | 5/1976 | Priegel ................................. 123/119 |
| 4,130,099 | * 12/1978 | Ferguson .............................. 123/590 |
| 4,167,165 | 9/1979 | Finlay ................................. 123/122 |
| 4,230,081 | 10/1980 | Meek ................................... 123/555 |
| 4,345,570 | 8/1982 | McNeece ............................. 123/557 |
| 4,364,365 | 12/1982 | Gendron ............................. 123/557 |
| 4,498,447 | 2/1985 | Harvey ................................ 123/557 |
| 4,594,991 | 6/1986 | Harvey ................................ 123/557 |
| 5,437,258 | 8/1995 | Williams ............................. 123/593 |
| 5,572,979 | * 11/1996 | Czadzeck ............................ 123/590 |

* cited by examiner

Primary Examiner—Noah P. Kamen
(74) Attorney, Agent, or Firm—Gardere Wynne Sewell LLP; Edwin S. Flores; Sanford E. Warren. Jr.

(57) ABSTRACT

The present invention is a micromixing apparatus for creating a closer union of fuel and air molecules, in combination with an internal combustion engine and fuel supply, that includes a variable width cylinder designed to fit within a housing, the interior and exterior of the cylinder defining at least two paths; and a variable width interior core positioned within the variable width cylinder, whereby fuel and air molecules that travel along the length of the variable width cylinder and interior core change in speed and volume as they travel through the at least two paths defined by the cylinder and the interior core.

20 Claims, 4 Drawing Sheets

METHOD AND ARTICLE OF MANUFACTURE FOR IMPROVING FUEL/AIR MIXING IN INTERNAL COMBUSTION ENGINES

FIELD OF THE INVENTION

The present invention relates in general to internal combustion engine carburetion systems, and in particular, to an improved post carburetion method and apparatus for creating a closer union of hydrocarbon and air molecules in fuel sources used within an engine.

BACKGROUND OF THE INVENTION

Without limiting the scope of the invention, its background is described in connection with engine carburetors for two and four intake manifolds, as an example.

Internal combustion engines rely upon distinct principles of operation to effectuate their intended purpose. One, a fuel/air mixture must be delivered to a combustion chamber. Two, that mixture must be compressed, prior to ignition. Three, once ignited, a means must be provided to displace the power released by the "exploded" mixture. And fourth, provision must be made to eliminate all residue gases in the combustion chamber, prior to introducing a fresh fuel/air mixture to the compression cylinder. The present invention speaks to the production of a volatile mixture of fuel and air, prior to the delivery of that mixture to the engine's combustion chamber.

As used in conjunction with standard carburetion processes, today's internal combustion engines suffer a loss of efficiency varying between 27% and 45%. Such loss of efficiency is directly attributable to the quantity of hydrocarbon and air molecules remaining unburned during the engine's power, or combustion phase. Given this inefficiency, it is clearly desirable to improve upon present day internal combustion engine fuel/air mixture processes, and apparatuses.

A number of attempts have been made to improve the homogeneity of fuel and air mixtures being supplied to an internal combustion engine. Such undertakings often rely upon exhaust gas, "coolant" or other engine derived heat source, to heat some or all of the fuel, air, or fuel and air mixture to promote enhanced mixing. Enhanced mixing, in turn, provides for improved dispersion of fuel throughout the air volume. Devices and techniques for improving gas mileage, operating performance and internal combustion engine efficiency are numerous, known and evidenced in the prior art.

By way of example, U.S. Pat. No. 3,968,781 discloses a fuel atomizing device for carburetors of internal combustion engines. U.S. Pat. No. 4,063,541 discloses a carburetor providing a uniformly atomized fuel mixture. U.S. Pat. No. 4,162,281 discloses a carburetor fuel atomization apparatus. U.S. Pat. No. 5,000,152 discloses a fuel conservation means for internal combustion engines. U.S. Pat. No. 5,053,170 discloses a fuel atomizing device for carburetors. U.S. Pat. No. 4,230,081 discloses a system for improving internal combustion engine efficiency. U.S. Pat. No. 4,345,570 discloses a fuel heating apparatus for vehicles. U.S. Pat. No. 5,437,258 discloses a carburetor fuel atomizer. U.S. Pat. No. 4,594,991 discloses a fuel and water vaporizer for internal combustion engines. Lastly, U.S. Pat. Nos. 4,167,165, 4,498,447 and 4,364,365 all purport to disclose fuel vaporizers for internal combustion engines.

SUMMARY OF THE INVENTION

It has been found, however, that the present methods and intake manifolds for internal combustion engines based on gasoline, fail to improve on the 27 to 45 percent inefficiency in combustion. This inefficiency in combustion leads to the increases in environmental contamination from already inefficient engines. Also, present carburetors have an added problem of having a need for frequent tuning.

What is needed is a method, apparatus and system that improves engine fuel efficiency. Also needed is an apparatus and method for decreasing the environmental contamination caused by the internal combustion without decreasing the power output of the engine.

The present invention differs substantially from the conventional concepts and designs of the prior art when providing a closer union of hydrocarbon and air molecules in fuel sources used in internal combustion engines, without increasing the temperature of the mixture. It has been found that the present invention improves upon the efficiency of an engine's internal combustion process and allows for a reduction in fuel consumption by generating a micromist caused by micromixing fuel and air. By decreasing the size of the fuel droplet using a combination of air turbulence and changes in pressure the present invention causes the formation of a fine mist without the need to increase the temperature of the fuel/air mixture and without decreasing the power output of the engine.

In fact, the present inventor has found that the present invention increases fuel efficiency, power and engine life, while concurrently decreasing environmental contamination. Recognizing the significance of increase in engine operating efficiency, it can be readily appreciated that there exists a continuing, real need for an improved internal combustion engine fuel/air mixing and integration method and apparatus. Finally, the present invention has no moving parts that can wear and does not require electrical or other motive force inputs.

The present invention provides for increased durability, improved performance, and structural integrity over existing mixing methods and apparatuses. Indeed, the present invention has been found to increase both the power and life of an internal combustion engine. Several unique improvements over the prior art are presented by the present invention. The invention is absent any moving parts. Also, the invention does not require any electrical connections or motors to initiate or perform its mixing process. Finally, the invention is easy to install in pre-existing engines without the need to drill into existing parts and does not adversely affect engine performance or tuning. In fact, the present invention has been found to lengthen the time between tunings.

A primary object of the present invention is to insight, or further micromist or micromix, molecules of hydrocarbon and air causing a closer union of the two molecules for more efficient combustion. The present invention reduces the velocity and rotation of the turbulence of a fuel and air mixture as it passes through the invention from an internal combustion engine's carburetor into the combustion chamber. Furthermore, the present invention reduces environmental contamination through a more efficient combustion process achieved through the superior mixing and more complete integration of hydrocarbon and air molecules.

More particularly, the present invention is a micromixing apparatus for creating a closer union of fuel and air molecules, in combination with an internal combustion engine and fuel supply, the apparatus includes a variable width cylinder designed to fit within a housing, the interior and exterior of the cylinder defining at least two paths and a variable width interior core positioned within the variable width cylinder, whereby fuel and air molecules that travel along the length of the variable width cylinder and interior core change in speed and volume as they travel through the at least two paths defined by the cylinder and the interior core. The variable width cylinder may also include a diffusing crown integrated as part of the exterior of the cylinder.

The variable width interior core may also include at least one pressure differentiation protrusion that extends into at least one of the paths. The variable width cylinder may also include at least one path exchange orifice that permits the fuel and air mixtures traveling along the at least two paths to mix. A cone may be located at the end of the cylinder and even the interior core to cause an expansion of the fuel air mixture.

In another embodiment of the invention a misting or micromixing apparatus housing having two or more openings may also include at least one variable width cylinder located within each of the misting or micromixing apparatus housing, at least one bolting mechanism positioning guide integrated within the misting or micromixing apparatus housing and at least one bolting mechanism connecting the misting or micromixing apparatus housing to an engine intake manifold. An intake manifold adapter may also be attached to the misting or micromixing apparatus housing, as well as carburetor adapter. The housing may also include at least one warm air induction input.

The present invention also includes a method for creating a closer union of hydrocarbon and air molecules for use in combination with an internal combustion engine and fuel supply, the method including the steps of, directing fuel and air molecules into at least two paths, whereby the length and volume defined by the first and second paths varies along the length of the at least two paths and causes an expansion and contraction of the hydrocarbon and air molecules as they travel the length of the paths. The method may also include the step of mixing the fuel and air molecules mixtures in the first and second paths through at least one opening that communicates between the paths, whereby the mixture from the paths combine. One may also provide one or more escape cones at the end of the first and second paths whereby the one or more cones cause a final expansion of the mixture before entering the combustion chamber of an engine. The mixing of the fuel air mixture may be accomplished by facilitating transport of the fuel and air molecules laterally and bi-directionally between the at least two paths. Also, the method may include reducing the rotation of the fuel and air mixture by positioning at least one diffusion crown in at least one of the paths.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
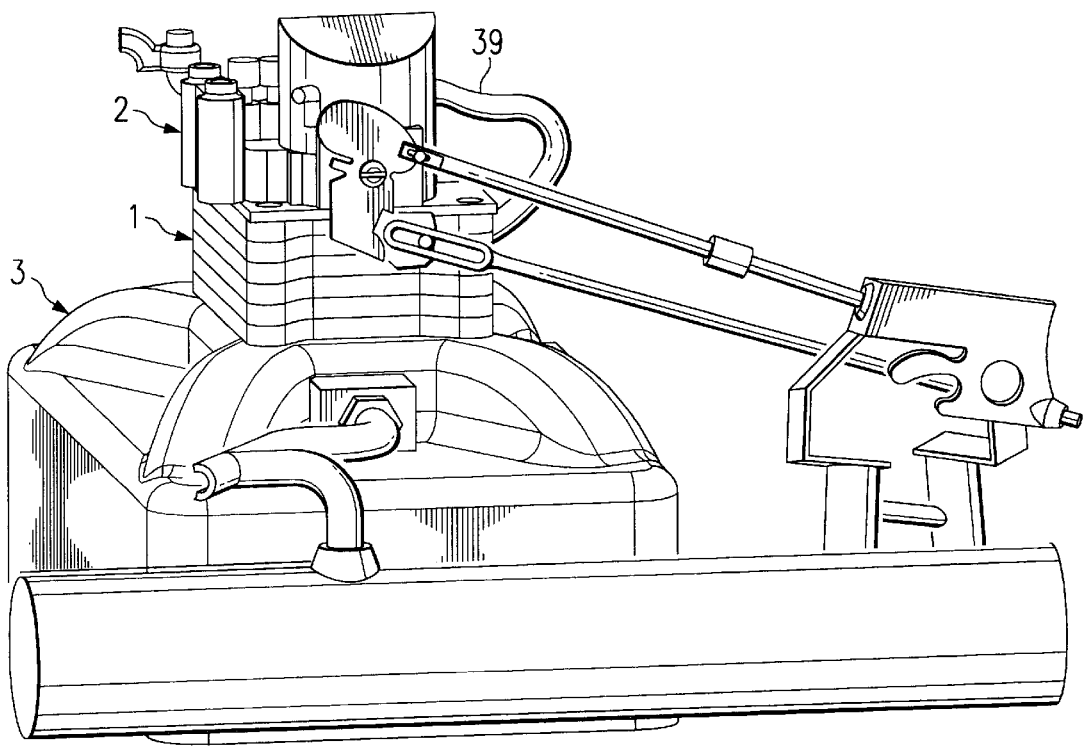
FIG. 1 is a perspective view of one form of the invention illustrated in combination with an internal combustion engine.

Turning now to FIG. 1. FIG. 1 shows the invention's misting or micromixing apparatus housing (1) interposed between an internal combustion engine's carburetor (2) and an internal combustion engine's intake manifold (3) and illustrates the positioning of the invention, most particularly, the invention's misting or micromixing apparatus housing (1) as it is to be configured in typical internal combustion engine applications. FIG. 1 further illustrates one position, though not necessary, for the invention's warm air induction means flexible tubing (39).

Figure 2:
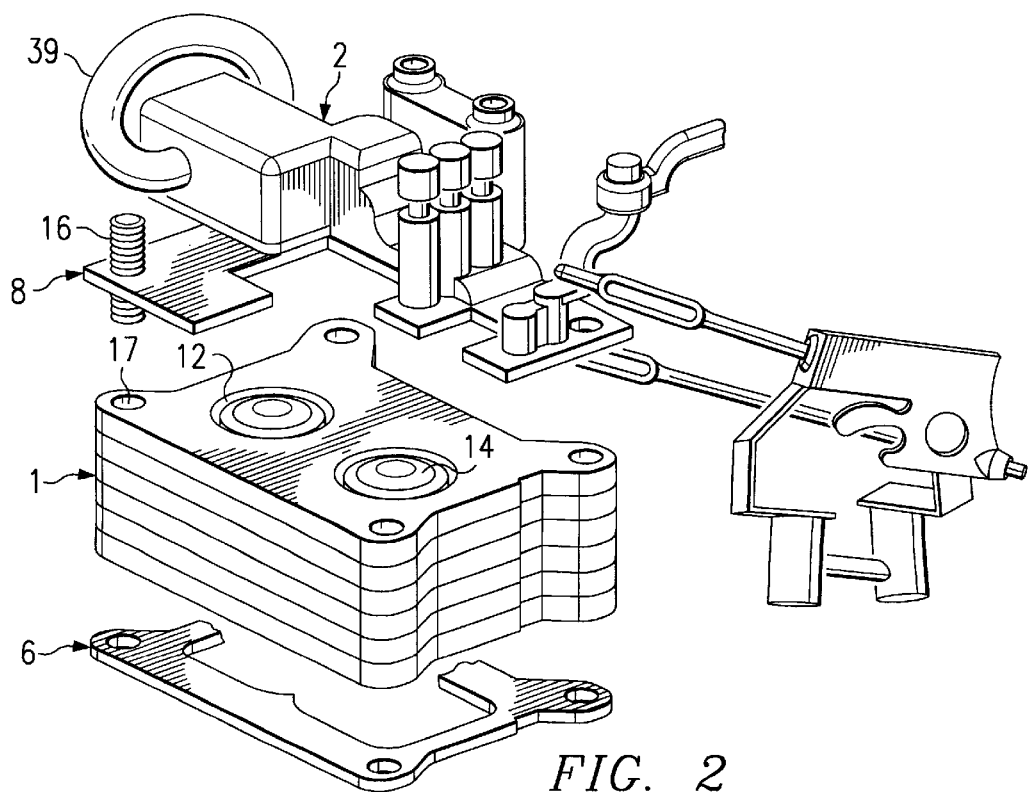
FIG. 2 is a perspective view of one form of the invention illustrated in combination with an internal combustion engine intake manifold and carburetor.

Referring now to FIG. 2. As can be seen from FIG. 2, the invention's misting or micromixing apparatus housing (1) is positioned with respect to an internal combustion engine's carburetor (2) and the engine's intake manifold (3) by using an intake manifold adapter (6) and a carburetor adapter (8). A bolting mechanism positioning guide (17) allows for a bolting mechanism (16) to position, and connect the engine's carburetor (2), carburetor adapter (8), misting or micromixing apparatus housing (1), intake manifold adapter (6), and the intake manifold (3). Also illustrated in FIG. 2, and as will be discussed in appropriate sections of this disclosure, are the invention's warm air induction means flexible tubing (39), the invention's misting or micromixing concentric cylinder (12) and the invention's diffusing crown (14).

Figure 3:
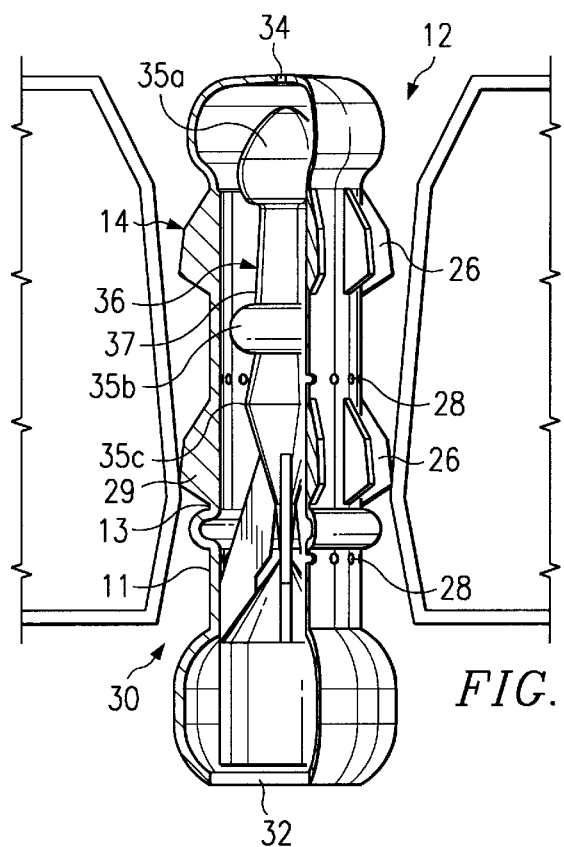
FIG. 3 is a part diagram, part cross-sectional illustration showing an external view of the invention's misting or micromixing cone seated within the invention's concentric cylinder.

Turning now to FIG. 3 a partial cross-sectional view of the present invention is depicted. The present invention facilitates its purpose of creating a closer union of fuel and air molecules via post carburetion processing. Such processing entails repeatedly integrating the fuel and air molecules via the invention's pressure and flow-rate variation process and apparatus, and more specifically, speaks to the repeated integration and exchange of the fuel and air molecules between the invention's misting or micromixing unit's interior core cylinder (37), and the misting or micromixing concentric cylinder (12). The invention's misting or micromixing concentric cylinder (12) is presented as a function and form within the misting or micromixing apparatus housing (1) and is not to be deemed limited to a specific carburetor/intake manifold configuration. The invention provides for, and supports, any configuration of carburetor and intake manifold design requirements (i.e. single, dual, or multiple barrel carburetors, and single or multiple intake manifold ports).

Subsequent to the standardized carburetion process, an initial fuel/air mixture is introduced paths formed by the invention's misting or micromixing concentric cylinder (12) and interior core cylinder (37). The fuel and air mixture is introduced into the interior core cylinder (37) via the interior core micromixing inlet (34). Fuel introduced to the invention's misting or micromixing concentric cylinder (12) is forced downward, and across a diffusing crown (14) located in this embodiment between the cylinder (12) and the housing (1).

The purpose of the invention's diffusing crown (14) is to reduce both the lateral velocity and the turbulence of the fuel air mixture that is caused during standardized carburetion, as well as provide for variations in pressure and flow rate within a fuel stream entering the mixing paths. Proceeding downward through the misting or micromixing concentric cylinder (12), increased pressure is placed upon the fuel/air mixture as the circumference of the cylinder is reduced. The increased pressure acts upon the introduced fuel/air mixture in the misting or micromixing concentric cylinder (12) and induces a transfer of the fuel/air mixture from the misting or micromixing concentric cylinder (12) to the invention's internal core cylinder (37) through the invention's chamber exchange openings (28).

The invention may also include one or more exchanges between the misting or micromixing concentric cylinder (12) to internal core cylinder (37) based upon the severity of reduction in the misting or micromixing concentric cylinder (12) circumference reduction and the availability and number of chamber exchange orifices (28). The invention's external cone body (11) may be seated flush against the concentric cylinder walls (13), causing passage of any fuel/air throughout that cylinder to be facilitated by one, or any number of suppressed channels (26) formed between flanges (29) located along the misting or micromixing concentric cylinder's (12) exterior cone body (11). The external cone body (11) may be pressure-fitted into the housing (1) or may even be welded into the housing (1).

In operation, the interior core components (36) and processes associated therewith are next discussed and explained. A fuel/air mixture having been produced in association with a standardized carburetion process enters the internal portion of the concentric cylinder (12) by way of the interior core micromixing inlet (34) and past the exterior and interior of the misting or micromixing unit interior core (36).

One or more pressure differentiation protrusions (35a, b, c) are integrated as part of the invention's interior core (36). The differentiation protrusions (35a, b, c) cause a change in fuel/air velocity and pressure such that the speed of the fuel/air mixture in the interior core cylinder (37) and concentric cylinder (12) vary with respect to one another. Consequently, an exchange of fuel/air mixture from the interior core cylinder (37) to the concentric cylinder (12), via the invention's chamber exchange opening (28) is initiated.

The changes in fuel/air mixture pressure and velocity caused by both the internal protrusions (35a, b, c) and the diffusion crowns (14, 29) force the fuel and air molecules to form a fine mist that brings smaller particles or droplets of fuel together with air molecules, in particular, oxygen. The present invention creates this fine mist without the need of electrical elements and without moving parts.

The fuel/air mixture is introduced to the internal combustion engine's intake manifold by way of two avenues, the invention's concentric cylinder micromixing outlet (30) and internal core micromixing outlet (32). The fuel/air mixture that enters the engines intake manifold has lost all rotation and enters as a fine mist that is more readily combusted than in regular carburetion.

Figure 4:
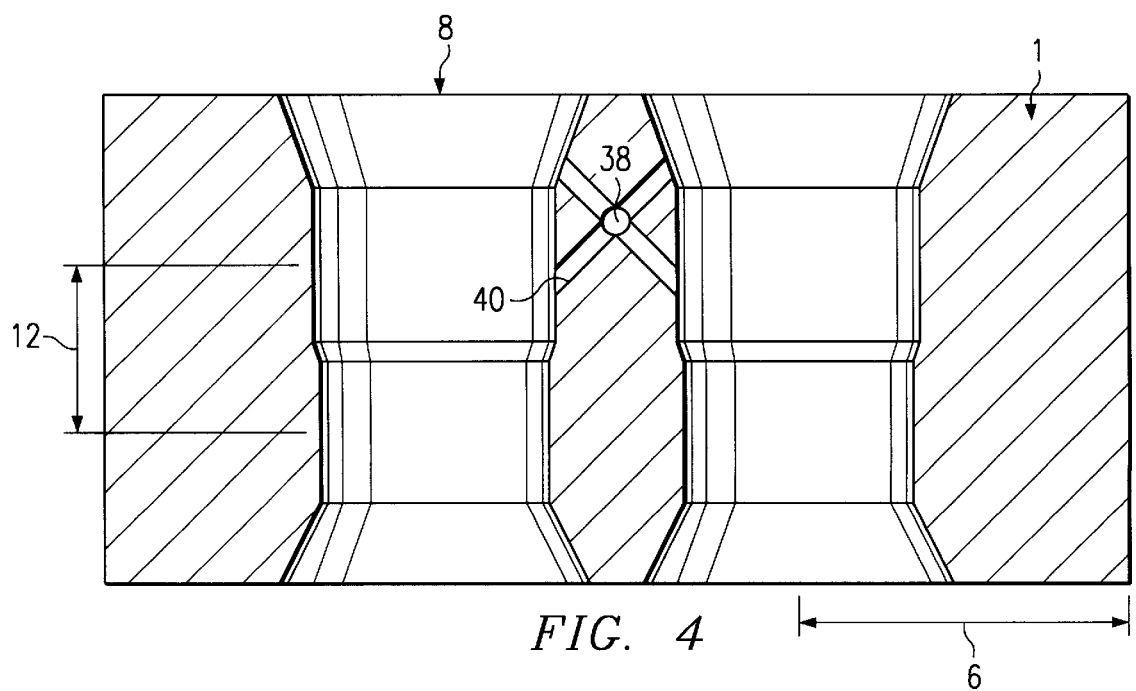
FIG. 4 is a cross sectional view of the invention's concentric cylinders further illustrating an alternative embodiment of the present invention.

Turning now to FIG. 4. FIG. 4 is a cross-sectional view of the invention's concentric cylinders (12) that serve to illustrate an alternative embodiment of the present invention that includes a warm air induction means, a warm air inductor (38) and a warm air induction channel (40). For purposes of clarity, the invention's external cone body has been eliminated from this illustration. As noted earlier, fuel and air processed by a standardized carburetion process produces high velocity, highly turbulent fuel/air mixtures.

The present invention uses a diffusing crown (14) to initially diffuse such velocity and turbulence and allow for better mixing of fuel air molecules. As an adjunct to the diffusing crown (14), the invention also provides for a warm air inductor (38) to introduce heat into the concentric cylinder (12) via warm air induction channels (40) and thus diffuse, or slow, such rotation and velocity to an even greater degree, in particular, as the warm air introduced into the misting or micromixing apparatus housing (1) crosses chamber exchange openings (28).

Figure 5:
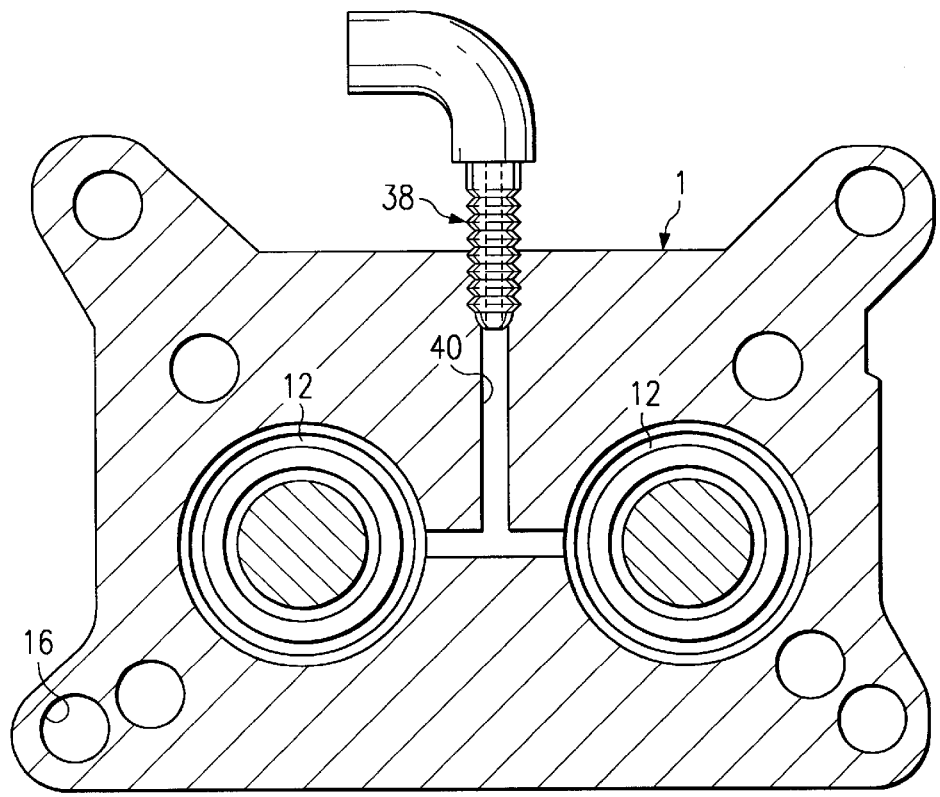
FIG. 5 is a top view of one form of the invention's warm air induction means.
Figures 7, 8:
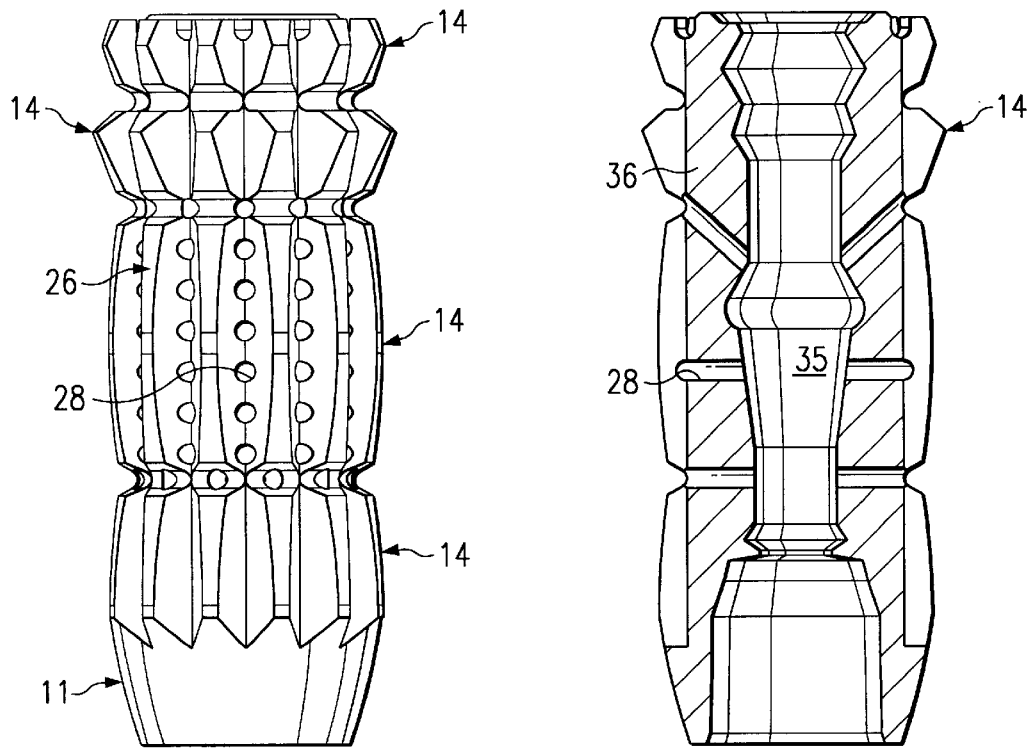
FIG. 7 illustrates a side view of an alternative embodiment of the invention's misting or micromixing cone.
FIG. 8 shows a cross-sectional view of an alternative embodiment of the invention's interior core.

Turning now to FIG. 5. FIG. 5 is a top view showing one form of the invention's warm air induction means. The invention's warm air induction means is a hollow fitting (38) that enters into the misting or micromixing apparatus housing (1) and introduces warm air through warm air induction channels (40). Warm air is provided to the hollow fitting (38) by a flexible tubing (39) attached to, e.g., a standardized carburetor (2) automatic choke mechanism. Consequently, warm air is introduced into the invention's concentric cylinder (12) to assist in diffusing, or slowing, fuel/air mixture rotation and velocity.

Figure 6:
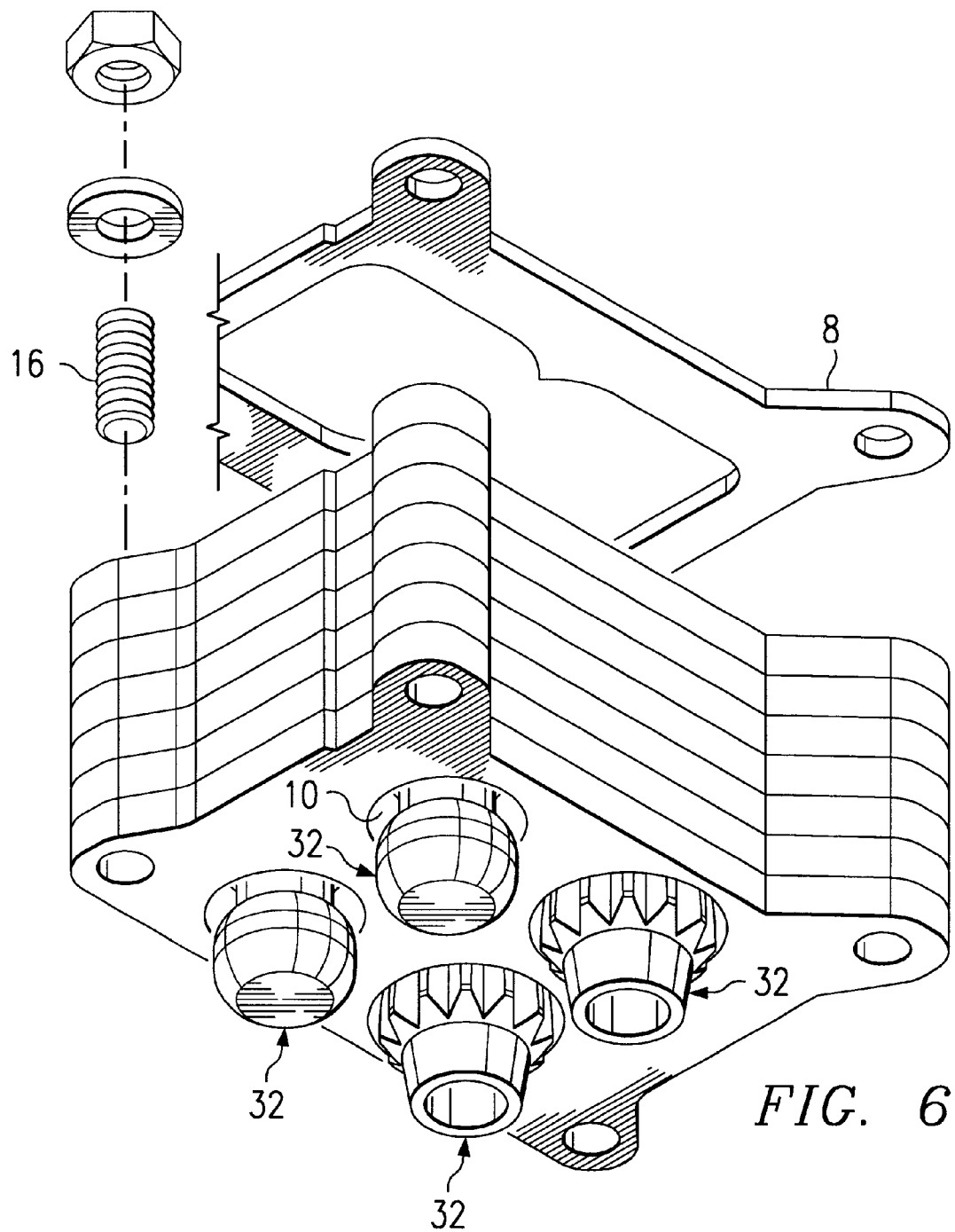
FIG. 6 is a perspective view of one form of the invention illustrating the invention's interior core and concentric cylinder.

Turning now to FIG. 6. FIG. 6 is provided to further detail one form of the invention's internal core micromixing outlet (32) and the concentric cylinder micromixing outlet (30). FIG. 6 also serves to depict a bolting mechanism (16) that may be provided in multiple arrangements within a same misting or micromixing apparatus manifold (1) so that it fits engines produced by different manufacturers. Likewise, the carburetor adapter (8) may be molded to match the misting or micromixing apparatus manifold (1) and the particular attachment points of a particular manufacturer's carburetor to engine manifold.

FIG. 7 provides a side, external view showing an alternative embodiment of the invention's exterior cone body (11), the invention's diffusing crowns (14), suppressed channel (26) and chamber exchange opening (28). In this configuration, the chamber exchange openings (28) run vertically along the shaft of the misting or micromixing concentric cylinder (12), in this case, within the suppressed channels (26). Also depicted are chamber exchange openings (28) that run horizontally around the shaft of the misting or micromixing concentric cylinder (12), which in combination with the vertically aligned openings (28), ensure that the rotation of the fuel/air mixture is stopped and serves to cause further mixing of the fuel/air mixture.

Turning now to FIG. 8. FIG. 8 provides cross-sectional illustration showing the interior alternative embodiment of the invention's interior core (36), pressure differentiations protrusion (35) and chamber exchange openings (28). Through the main opening 45, the fuel/air mixture that enters the misting or micromixing concentric chamber (12) passes through a series of expansion and contraction zones in which the pressure, velocity and rotation of the mixture changes. To increase the mixing of the fuel/air mixture the chamber exchange of openings (28) cause for the expansion and contraction of the fuel and air mixture, not unlike the turbulence that is formed at the edges of aircraft wings.

In fact, it is this type of turbulence that causes the present invention to increase fuel efficiency by reducing fuel consumption of engines fitted with the present invention as measured in decreased fuel consumption at 700 and 1,674 rpm (See Table I). An increase of 10 percent in horsepower was obtained with a concurrent decrease of fuel consumption of 30 percent at 700 rpm and 20 percent at 1,674 rpm. The amount of carbon monoxide was also decreased at both rpms measured. The present invention was tested using the two barrel configuration in an Oldsmobile 1987 with a 387 eight cylinder engine. The drop in fuel/air mixture density caused by the turbulence also leads to decreased contamination as measured by a decrease in carbon monoxide output, while concurrently increasing engine power and performance.

TABLE I

Internal Carburetor Combustion Engines
Normal Measurements of Carbon Monoxide from 10 to 14%

| Normal Engine V-8 | Misting or micromixing Apparatus in V-8 Engine | |
| --- | --- | --- |
| HIGH | HIGH | LOW |
| 3,500 R.P.M. | 1,674 R.P.M. | 700 R.P.M. |
| C—O = 6% to 7% | C—O = 1.89% | C—O = 0.50% |
| H C – 300% | H C – 303% | H C – 537% |
| $CO_2$ 12 to 14% | $CO_2$ 12.2% | $CO_2$ 14.0% |
| | $O_2$ 1.1% | $O_2$ 1.3% |
| LOW R.P.M. | | |
| C—O = 1. to 1.2 | | C—O = 0.50 |

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A micromixing apparatus for creating a closer union of fuel and air molecules, in combination with an internal combustion engine and fuel supply, comprising:
   a housing containing a variable width cylinder comprising a cone located at one end of the variable width cylinder; and
   a variable width interior core positioned within the variable width cylinder, the interior core and the variable width cylinder defining at least two paths, whereby fuel and air molecules that travel along the length of the variable width cylinder and interior core change in speed and volume as they travel through the at least two paths defined by the variable width cylinder and the interior core.

2. The apparatus of claim 1, wherein the variable width cylinder further comprises a diffusing crown integrated as part of the exterior of the cylinder.

3. The apparatus of claim 1, wherein the variable width interior core is further defined as comprising at least one pressure differentiation protrusion.

4. The apparatus of claim 1, wherein the variable width cylinder is further defined as comprising at least one path exchange orifice that permits the fuel and air mixtures traveling along the at least two paths to mix.

5. The apparatus of claim 1 wherein the apparatus further comprises:

a micromixing housing; and
   at least one variable width cylinder in accordance with claim 1 located within the micromixing housing.

6. The apparatus of claim 5, wherein the micromixing apparatus housing further comprises at least one warm air induction input.

7. A micromixing apparatus housing having two or more variable width openings comprising:
   at least one variable width cylinder located within each of the variable width openings, the at least one variable width cylinder comprising a cone located at one end of the variable width cylinder;
   at least one bolting mechanism positioning guide integrated within the micromixing apparatus housing; and
   at least one bolting mechanism connecting the micromixing apparatus housing to an engine intake manifold.

8. A micromixing apparatus housing of claim 7, further comprising an intake manifold adapter attached to the micromixing apparatus housing.

9. A micromixing apparatus housing of claim 7, further comprising a carburetor adapter attached to the micromixing apparatus housing.

10. The apparatus of claim 7, wherein the micromixing apparatus housing further comprises at least one warm air induction input.

11. A method for creating a closer union of hydrocarbon and air molecules for use in combination with an internal combustion engine and fuel supply, the method comprising the steps of:
   directing fuel and air molecules into at least two paths between a variable width core and the interior of a variable width cylinder, the variable width cylinder comprising a cone located at one end of the variable width cylinder, whereby the length and volume defined by the first and second paths varies along the length of the at least two paths and causes an expansion and contraction of the hydrocarbon and air molecules as they travel the length of the at least two paths.

12. The method of claim 11, further comprising the step of:
   mixing the fuel and air molecules mixtures in the first and second paths through at least one opening that communicates between the at least two paths, whereby the mixture from the first and second paths combine.

13. The method of claim 11, further comprising the step of:
   providing one or more escape cones at the end of the first and second paths whereby the one or more cones cause a final expansion of the mixture before entering the combustion chamber of an engine.

14. The method of claim 11, further comprising the step of:
   providing air that has been previously warmed into at least one of the paths.

15. The method of claim 11, further comprising the step of: facilitating transport of the fuel and air molecules laterally and bi-directionally between the at least two paths.

16. The method of claim 11, further comprising the step of: reducing the rotation of the fuel and air mixture by positioning at least one diffusion crown in at least one of the paths.

17. The method of claim 11, further comprising the step of: introducing the fuel and air mixture into an internal combustion engine via the engine's intake manifold.

18. The method of claim 11, wherein the at least two paths are defined by the interior and exterior of a concentric cylinder.

19. The method of claim 18, wherein the concentric cylinder is located within a housing on an engine intake.

20. A method for creating a closer union of hydrocarbon and air molecules in combination with an internal combustion engine and fuel supply, comprising the steps of:

directing previously combined fuel and air molecules into a concentric cylinder containing a micromixing apparatus, the concentric cylinder comprising a cone located at one end of the concentric cylinder;

directing previously combined hydrocarbon and air molecules to a micromixing apparatus interior core cylinder;

reducing the rotation and velocity of the concentric cylinder directed hydrocarbon and air molecules by passing the molecules over a micromixing apparatus diffusing crown;

further reducing the rotation and velocity of the concentric cylinder directed hydrocarbon and air molecules by introducing heated air to the cylinder;

causing the concentric cylinder directed molecules and the interior core cylinder directed modules to be transported throughout the concentric cylinder and the micromixing apparatus interior core cylinder;

causing pressure differentiation in between the concentric cylinder and the interior core cylinder;

facilitating transport of the molecules laterally and bi-directionally between the interior core cylinder and the concentric cylinder; and introducing the transported molecules to an internal combustion engine via the engine's intake manifold.

* * * * *